Figure 1:
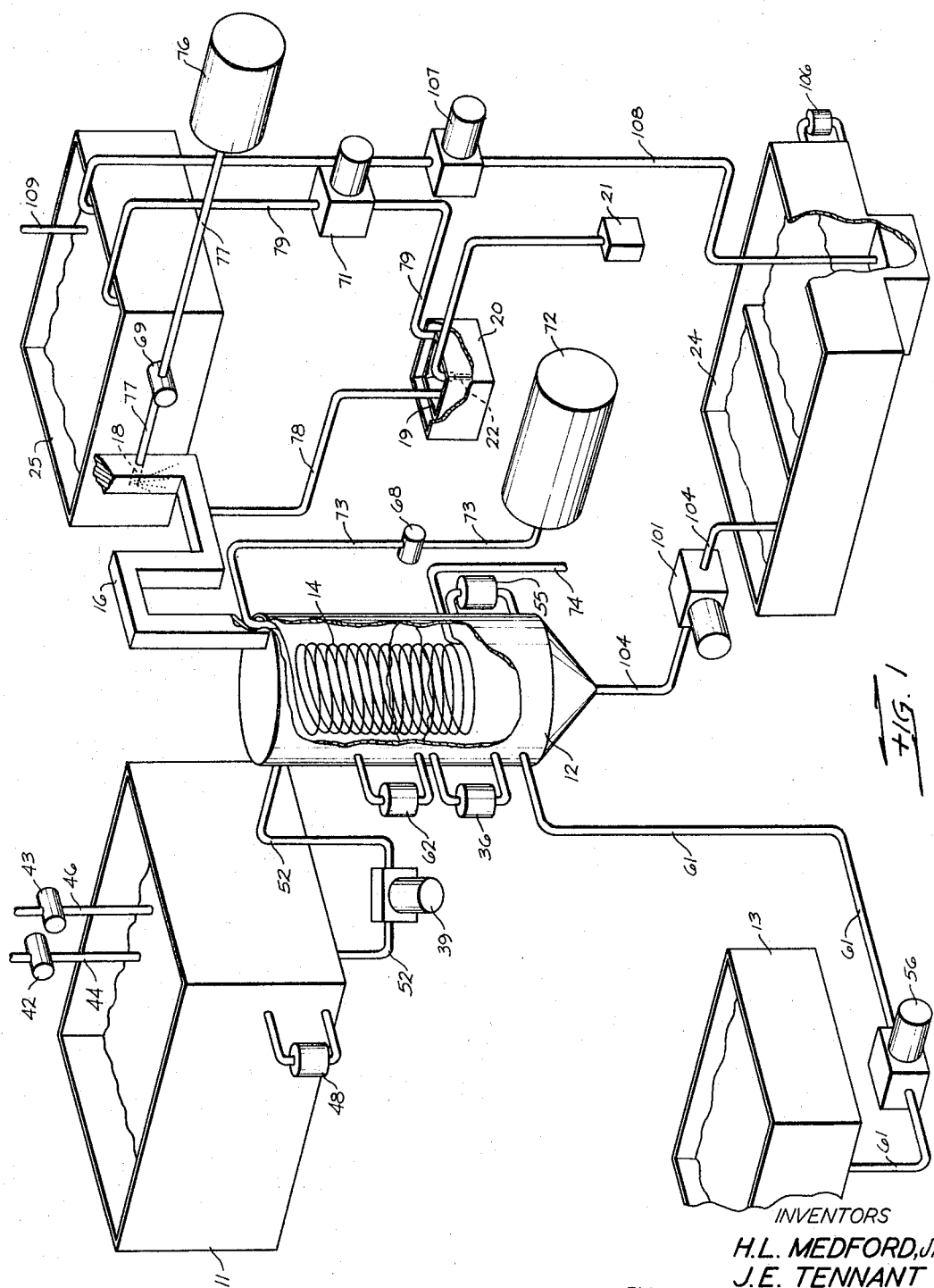

United States Patent Office 3,301,542
Patented Jan. 31, 1967

3,301,542
SYSTEM FOR TREATING ACIDIC ETCHING SOLUTIONS
Hugh L. Medford, Jr., Greensboro, and John E. Tennant, High Point, N.C., assignors to Western Electric Company, Incorporated, New York, N.Y., a corporation of New York
Filed Dec. 4, 1963, Ser. No. 328,089
7 Claims. (Cl. 266—12)

This invention relates to a system for treating acidic etching solutions. More particularly, this invention relates to a system for automatically treating copper-contaminated ammonium peroxydisulphate etching solutions to recover the copper therefrom and dispose of the remaining solution.

In the manufacture of printed circuit boards, conductive patterns of copper foil are often formed by etching away certain portions of the foil with ammonium peroxydisulphate etching solution. As the solution is used over a period of time for etching, it becomes contaminated with copper and it is therefore necessary to dispose of such contaminated solution. In so disposing of this solution, which is strongly acidic, it is important to render it innoxious so that the solution may be dumped into a conventional sewage disposal system. Moreover, it is advantageous to recover the copper from the contaminated solution since such copper can be sold as scrap metal. Additionally, it is advantageous to automatically render the solution innoxious and simultaneously recover the copper therefrom.

Accordingly, it is an object of this invention to provide a new and improved system for the disposal of acidic etching solutions.

Another object of the invention is to provide a system for automatically treating copper-contaminated ammonium peroxydisulphate etching solutions to recover the copper therefrom and dispose of the remaining solution.

A further object of this invention is the provision of a system for automatically treating copper-contaminated ammonium peroxydisulphate etching solutions to recover the copper therefrom and dispose of the remaining solution, wherein the pH of a basic solution resulting from a gas evolved from a reaction retort is monitored by a pH responsive control circuit which is rendered effective by a timing mechanism after the pH of the solution increases beyond a predetermined value.

With these and other objects in view, the present invention contemplates a system for treating an acidic etching solution. Such system includes a reaction retort and a pump which feeds the etching solution into the retort. Also, another pump feeds a neutralizing agent into the retort; whereupon the etching solution reacts with the neutralizing agent to produce a precipitate and a gas. An escape vent connected to the upper portion of the retort collects this gas. Connected through a third pump to the lower portion of the retort is a settling basin for collecting the precipitant. A level control switch, responsive to the level of the solution in the retort, actuates a spraying device to scatter water into the escape vent; whereupon, such water reacts with the gas evolved from the retort to produce a basic solution in the vent. A sensing tank connected to the vent collects the basic solution therein. A pH responsive control circuit including a pair of electrodes positioned in the sensing tank, is rendered effective by a timing mechanism after the pH of the solution in the sensing tank increases beyond a predetermined value. After this circuit is rendered effective, such circuit monitors the treating system and when the pH of the solution in the sensing tank reaches a predetermined value, the circuit renders ineffective the spraying device and actuates the third pump to pass the precipitate from the retort to the settling basin.

Figure 2:
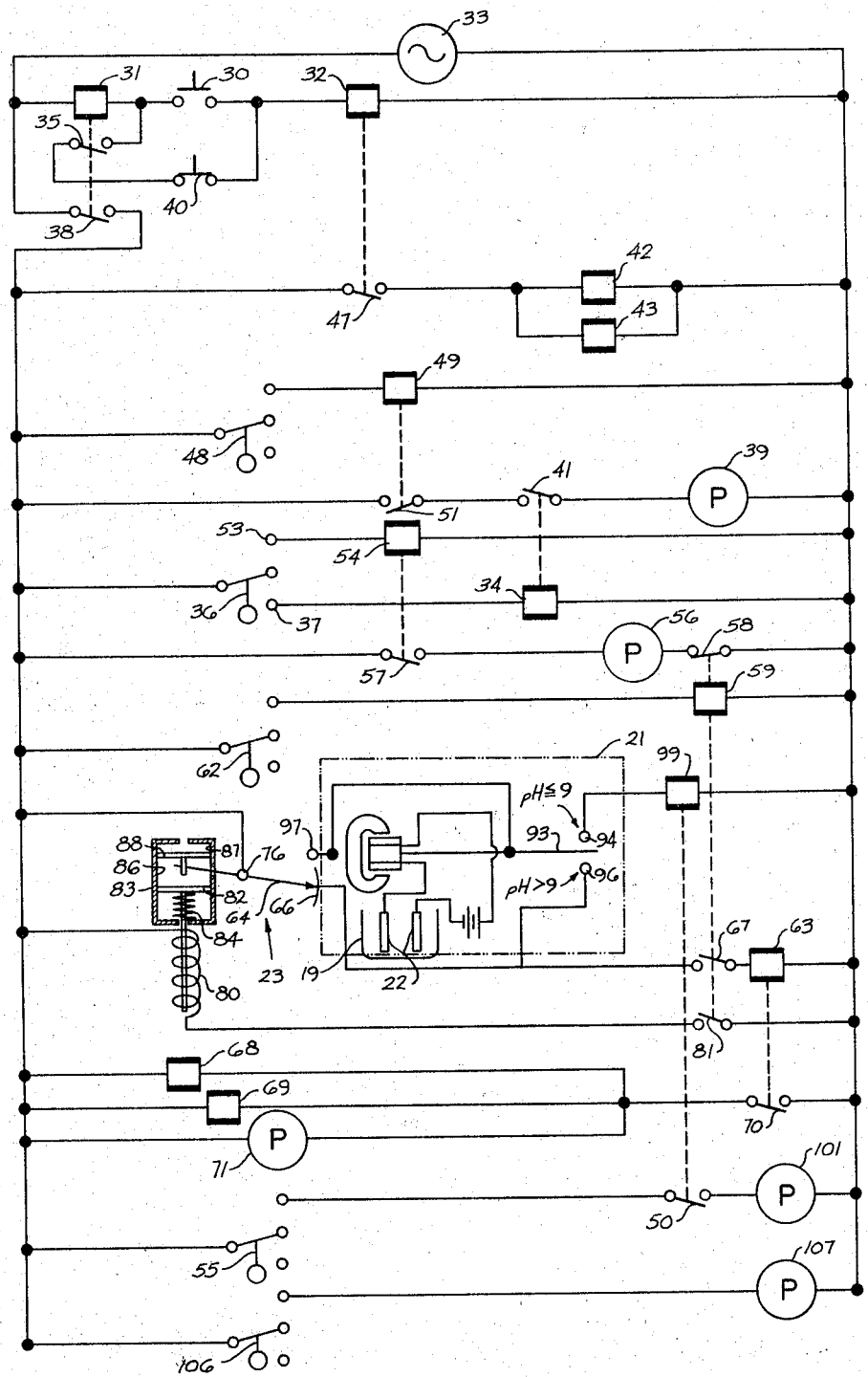

Other objects and advantages of the invention will be more clearly understood by reference to the following drawings, wherein:

FIG. 1 is a perspective schematic view of a system for treating an acidic etching solution; and FIG. 2 is a schematic diagram of a circuit for controlling the system of FIG. 1.

Considering first the overall operation of the treating system, a copper contaminated or spent ammonium peroxydisulphate etching solution and water used to rinse etched printed circuit boards are fed into a solution storage tank 11 where the etching solution and rinse water mix with each other. From this tank 11, the mixture of spent etching solution and rinse water is fed into a reaction retort 12. Next, a predetermined amount of a twenty-five percent solution of sodium hydroxide is fed from a storage tank 13 into the retort 12 where such sodium hydroxide solution chemically reacts with the mixture of spent etching solution and rinse water.

To speed up the chemical reaction in the retort 12, the mixture of spent etching solution, rinse water and sodium hydroxide is heated to boiling by steam coils 14. The heating of the mixture in the retort 12 is continued until the ammonium ions of the mixture have been driven off as ammonia gas and until the copper ions of the mixture have been converted into copper oxide and copper hydroxide. The ammonia gas passes through an escape vent 16 located at the top of the retort 12 and is reacted with water from a spraying device 18 to form ammonium hydroxide which is drained into a sensing tank 19 and overflows into and is collected by a holding tank 20. Moreover, the copper oxide and copper hydroxide are precipitated in the bottom of the retort 12 in the form of a slurry.

A pH meter 21, having electrodes 22 located within the sensing tank 19, is actuated by a pneumatic relay 23, FIG. 2, which acts as a timer, after the chemical reaction in the retort has proceeded for a predetermined time. After being so actuated, the meter 21 monitors the treating system. As the reaction proceeds, the pH of the ammonium hydroxide solution in the tank 19 decreases eventually to a predetermined value, indicating that the reaction in the retort 12 is substantially complete. At this pH value, the meter 21 shuts off the spraying device 18 and stops the steam from passing through the coils 14. Also, at this pH value, the precipitated copper slurry in the bottom of the retort 12 is fed into a concrete settling basin 24. After a sufficient amount of time has been allowed for the copper oxide and copper hydroxide to settle out of the slurry, the solution remaining in the settling basin 24 is fed into an acid neutralizing tank 25. Also fed to this tank 25 is the ammonium hydroxide, which has flowed over the sensing tank 19 into the holding tank 20, to neutralize the solution, which includes an acid effluent, in the tank 25. The acid effluent in the tank 25 results from other printed circuit manufacturing operations such as acid plating or the like. When the solution in the tank 25 has been properly neutralized, it is fed into the city sewage system.

The copper oxide and copper hydroxide, which settled out of the slurry in the basin 24, are collected and sold as scrap material.

Thus, the spent etching solution has been automatically treated to recover scrap copper therefrom and to neutralize the remaining solution thereof to enable such solution to be discarded into the sewage system without damaging such system.

Referring now to FIGS. 1 and 2 to illustrate in detail the operation of the treating system, a normally open push button 30 is depressed to initiate a cycle of operation of the system. Depression of the push button 30 operates relays 31 and 32 over a path including relay 31, now closed push button 30, relay 32, and an alternating current source 33.

Operation of relay 31 operates relay 34 because at this time, there is no mixture in the retort 12 and a level control switch 36 is therefore in its downward position in engagement with a contactor 37. The operating path for relay 34 may be traced from source 33, now closed contacts 38 of now operated relay 31, switch 36, contactor 37, relay 34 back to source 33. The operation of relay 34 conditions a pump 39 for subsequent operation by the closing of contacts 41 of relay 34.

Also, operation of relay 31 establishes a holding circuit for relays 31 and 32 over a path including source 33, relay 31, now closed contacts 35 of now operated relay 31, normally closed push button 40, and relay 32.

Operation of relay 32 energizes solenoid valves 42 and 43 to open pipes 44 and 46. The energizing path for valves 42 and 43 may be traced from source 33, previously closed contacts 38 of previously operated relay 31, now closed contacts 47 of now operated relay 32, valves 42 and 43 back to source 33.

Opening of pipe 44 feeds by gravity or a pump (not shown) the copper-contaminated or spent etching solution (typically containing approximately 5 to 6 ounces by weight of copper per gallon of solution) into the storage tank 11. Similarly, opening of pipe 46 feeds the rinse water (typically containing approximately 500 to 1000 p.p.m. of copper) into the tank 11. Approximately equal amounts of the spent etching solution and rinse water are so fed into the tank 11 where they mix.

As the spent etching solution and rinse water are fed into the tank 11, the level of the mixture rises to a predetermined point to close a level control switch 48. Closure of the switch 48 operates a relay 49 over a path including source 33, previously closed contacts 38 of previously operated relay 31, now closed switch 48, and relay 49.

Operation of relay 49 energizes the pump 39 over a path including source 33, previously closed contacts 38 of previously operated relay 31, now closed contacts 51 of now operated relay 49, previously closed contacts 41 of previously operated relay 34, and pump 39.

Energization of the pump 39 delivers the mixture of spent etching solution and rinse water from the tank 11 through a pipe 52 into the reaction retort 12.

As the mixture is delivered to the retort 12, the level of the mixture in the retort 12 rises to a predetermined point; whereupon, the level control switch 36 moves to its upward position out of engagement with the contactor 37 and into engagement with another contactor 53.

Moreover, as the mixture is delivered to the retort 12, the level rises to close a second level control switch 55, but closure of this switch 55 has no effect at this time because contacts 50 are open.

Movement of the switch 36 out of engagement with the contactor 37 results in the releasing of relay 34, the opening of contacts 41, and the de-energization of the pump 39 to stop the delivery of mixture from the tank 11 to the retort 12. This delivery is stopped once the switch 36 moves out of engagement with the contactor 37 even if the mixture rises to a sufficient level in the tank 11 to close the switch 48, because at this time the contacts 41 are in an open condition, due to the movement of the contactor 37.

Movement of the switch 36 into engagement with the contactor 53 operates a relay 54 over a path including source 33, previously closed contacts 38 of previously operated relay 31, switch 36, contactor 53, and relay 54.

Operation of the relay 54 energizes a pump 56 over a path including source 33, previously closed contacts 38 of previously operated relay 31, now closed contacts 57 of now operated relay 54, normally closed contacts 58 of unoperated relay 59, and pump 56.

Energization of the pump 56 feeds a predetermined amount of the twenty-five percent solution of sodium hydroxide from the storage tank 13 through a pipe 61 into the reaction retort 12 where such sodium hydroxide solution mixes and chemically reacts with the spent etching solution and rinse water.

The feeding of the sodium hydroxide solution again raises the level of the mixture in the retort 12 to a predetermined point to close a third level control switch 62. Closure of the switch 62 operates relay 59 over a path including source 33, previously closed contacts 38 of previously operated relay 31, now closed switch 62, and relay 59.

Operation of relay 59 de-energizes the pump 56 by the opening of normally closed contacts 58.

The de-energization of the pump 56 stops the flow of the sodium hydroxide solution from the tank 13 through the pipe 61 into the retort 12. Thus, the spent etching solution, rinse water and sodium hydroxide have all been fed into the reaction retort 12, where they chemically react.

Although in the above-described system the mixture of spent etching solution and rinse water was fed into the retort 12 before the sodium hydroxide solution was fed into the retort 12, the sodium hydroxide solution could have been fed into the retort 12 before the mixture of spent etching solution and rinse water.

In a typical installation of the treating system, the level control switches 36 and 62 are arranged and the tanks 11 and 13 and the retort 12 are selected so that the relative volumes fed into the retort 12 are about (1) 360 gallons of the mixture of the spent etching solution and rinse water and (2) about 180 gallons of sodium hydroxide solution.

Moreover, operation of relay 59 operates a relay 63 over a path including source 33, previously closed contacts 38 of previously operated relay 31, contactor 64 of pneumatic relay 23, brush 66 of relay 23, now closed contacts 67 of now operated relay 59, and relay 63.

Operation of relay 63 energizes a solenoid steam valve 68, a solenoid spray valve 69 and a pump 71 over a path including source 33, previously closed contacts 38 of previously operated relay 31, valves 68 and 69, pump 71 and now closed contacts 70 of now operated relay 63.

Energization of the solenoid steam valve 68 releases steam under pressure from a tank 72 through a pipe 73 into the steam coils 14. Steam in the coils 14, which condenses into water, is discarded through an outlet 74 connected to the coils 14. The steam coils 14 heat the mixture of spent etching solution, rinse water, and sodium hydroxide to boiling, thereby increasing the rate of the chemical reaction in the retort 12.

The energization of the solenoil spray valve 69 passes water from a supply source 76 through a pipe 77 to the spraying device 18 which scatters droplets of water in the escape vent 16. Such droplets of water, which eventually extract ammonia gas from the vent 16, are passed by gravity through a pipe 78 into the sensing tank 19 which contains the electrodes 22 of the pH meter 21. The water overflows from the sensing tank 19 into the holding tank 20.

Energization of the pump 71 feeds the contents of the holding tank 20, which at this time is water collected from the vent 16, through a pipe 77 into the acid neutralizing tank 25.

In addition, operation of the relay 59 energizes an operating coil 80 of the pneumatic relay 23 over a path including source 33, previously closed contacts 38 of previously operated relay 31, coil 80, and now closed contacts 81 of now operated relay 59.

Energization of the operating coil 80 of the relay 23 moves downwardly a first piston 82 in a cylinder 83 against the action of a spring 84. The downward movement of the first piston 82 decreases the pressure in a first chamber 86 while the pressure in a second chamber 87 remains unchanged. Therefore, a second piston 88 moves downwardly to pivotally move the wiper 64, which now contacts the brush 66, about a point 76 in a counterclockwise direction. (An appropriate seal, not shown, is provided between the wiper 64 and the cylinder 83.) Due to the length of the brush 66, the wiper 64 remains in contact with the brush 66 for a predetermined time. During this time, the wiper 64 and brush 66 prevent the pH meter 21 from controlling the system by shunting it out of the system. This meter 21 is prevented from controlling the system at this time because the pH of the contents of the sensing tank 19 are less than 9. More particularly, the pH of the contents of the sensing tank 19 is about 6.5 to about 8 because the solenoid spray valve 69 is now energized resulting in the scattering of droplets of water in the escape vent 16 which are drained through the pipe 78 into the sensing tank 19. Therefore, an arm 93 of the meter 21 is in its upward position in engagement with contact 94. However, the meter 21 is now shunted out by wiper 64 and brush 66, rendering such engagement of arm 93 with contact 94 ineffectual.

Moreover, during this time the mixture in the retort 12 is being heated and the chemical reaction therein proceeds. Eventually, the ammonium ions of the mixture in the retort 12 are driven off as ammonia gas through the escape vent 16. This ammonia gas reacts with the droplets of water scattered in the vent 16 by the spraying device 18 to produce an ammonium hydroxide solution. This solution drains through the pipe 78 and passes into the sensing tank 19 to rapidly raise the pH of the contents thereof to above 9; whereupon, the arm 93 of the meter 21 engages contact 96.

(The meter 21 not only includes electrodes 22 in the sensing tank 19, arm 93, contacts 94 and 96, but also includes a permanent magnet, a moving coil, and a source of direct current. The meter 21 is similar to the meter-type relay shown on page 284 of Electronics and Nucleonics Dictionary by Cook and Markus, McGraw Hill, 1960, and operates on a conductivity basis due to the changing hydroxyl ion concentration in the sensing tank 19.)

As the chemical reaction in the retort 12 proceeds and the pH of the contents in the sensing tank 19 increases beyond 9, the second piston 88 moves further downward towards the bottom of its stroke and the wiper 64 moves out of contact with the brush 66 into engagement with a contact 97. Accordingly, the system is placed under the control of the meter 21. Since the pH at this time is greater than 9, the relay 63 remains operated by the engagement of the arm 93 with the contact 96.

Besides producing ammonia gas, the chemically reacting mixture in the retort 12 converts the copper ions in the mixture into copper oxide and copper hydroxide. As a result of the chemical reaction, such copper oxide and copper hydroxide are precipitated from the reacting mixture to form a slurry in the bottom of the retort 12.

As the reaction in the retort 12 continues, less ammonia gas is produced by the chemical reaction, while the spraying device 18 continues to scatter the same amount of water in the vent 16. Therefore, the basicity decreases and the pH of the ammonium hydroxide solution in the sensing tank 19 likewise decreases. As the reaction continues, the pH of the contents of the sensing tank 19 continues to decrease, and it eventually reaches a value of 9; whereupon, the arm 93 is moved to its upward position out of engagement with contact 96 and into engagement with the contact 94.

Movement of the arm 93 out of engagement with the contact 96 results in the releasing of the relay 63 by opening the operating path of such relay 63.

Release of the relay 63 de-energizes solenoid steam valve 68, solenoid spray valve 69, and pump 71 to condition these devices for re-operation upon another cycle of operation of the treating system.

Moreover, movement of the arm 93 into engagement with the contact 94 operates a relay 99 over a path including source 33, previously closed contacts 38 of previously operated relay 31, wiper 64, contact 97, arm 93, contact 94, and relay 99.

Operation of relay 99 energizes a pump 101 over a path including source 33, previously closed contacts 38 of previously operated relay 31, previously closed level control switch 55, now closed contacts 50 of now operated relay 99 and pump 101.

Energization of pump 101 feeds the copper slurry from the bottom of the retort 12 through a pipe 104 into the concrete settling basin 24. As the copper slurry leaves the retort 12, switches 36, 62 and 55 move to their downward positions, releasing relays 54 and 59, deenergizing pump 101, and operating relay 34.

Operation of relay 34 initiates another cycle of operation upon the level of the mixture in the tank 11 reaching a sufficient level to again operate switch 48.

Release of relay 59 de-energizes the operating coil 80 of the pneumatic relay 23, permitting the spring 84 to return the pistons 82 and 88 to their normal unoperated condition and to return the wiper 64 to the brush 66; whereupon, the relay 99 releases.

As the copper slurry is fed from the retort 12 through the pipe 104 into the concrete settling basin 24, the fluid level in the basin 24 increases to a predetermined point; whereupon, a level control switch 106 is closed. Moreover, the copper oxide and copper hydroxide settle out of the slurry in the basin 24 leaving a supernatant liquor. Then, the closure of the switch 106 energizes a pump 107 to feed this supernatant liquor remaining in the basin 24 through a pipe 108 into the acid neutralizing tank 25. As this solution is fed into acid neutralizing tank 25, the level in the basin 24 falls to open the level control switch 106 and de-energize the pump 107.

Additionally, acid plant waste from printed circuit plating operations; including sulfuric, nitric, phosphoric acids or the like, are fed through a pipe 109 into the tank 25 and mixed with the solution fed from the tank 24 to neutralize both the acid plant waste and the ammonium hydroxide; whereupon, the remaining solution is disposed into the city sewage system.

The cooper oxide and the copper hydroxide which settle in the basin 24 are collected periodically and sold as scrap material. Thus, the automatic treating system has neutralized the copper-contaminated etching solution and removed valuable copper constituents from such solution. Now, the treating system is ready for a new cycle of operation upon the level of the mixture in the tank 11 reaching a sufficient level to close level control switch 48. In the alternative, the entire system can be de-activated by the opening of the stop button 40 to release relay 31 and disconnect the source 33 from the entire electrical control system.

It is to be understood that the above-described embodiment of the invention is simply illustrative and that numerous modifications may be made within the spirit and scope of the invention.

What is claimed is:

1. In a system for treating an acidic etching solution, a retort for reacting the acidic etching solution with a neutralizing agent to produce a gas and a precipitate,
   means connected to the top of the retort for collecting the gas,
   means connected to the bottom of the retort for removing the precipitate therefrom,
   timing means,
   means responsive to the gas passing means and rendered effective by the timing means after a predetermined time from the commencement of the chemical reaction in the retort for actuating said removing means to pass the precipitate out of the retort.

2. In a system for treating an acidic etching solution,
a reaction retort,
means for feeding the acidic etching solution into the retort,
means for feeding a neutralizing agent into the retort to react such agent with the etching solution to produce a precipitate and a gas,
means connected to the upper portion of the retort for collecting said gas,
means connected to the retort for collecting said precipitate,
pump means connected between said retort and said precipitate collecting means,
means responsive to the level of the solution in the retort for scattering water into said gas collecting means to react such water with the gas to produce a basic solution in said gas collecting means,
a sensing tank connected to said collecting means for receiving said basic solution,
timing means,
a pH responsive control circuit rendered effective by said timing means after the pH of the solution in the sensing tank increases beyond a predetermined value and having a pair of electrodes positioned in said sensing tank for rendering ineffective said water scattering means and for actuating said pump means to pass the precipitate from the retort to the said collecting means.

3. In a system for automatically treating a copper-contaminated ammonium peroxydisulphate etching solution to recover the copper therefrom and to render innoxious the remaining solution,
a first tank for holding the copper contaminated ammonium peroxydisulphate etching solution,
a reaction retort,
a first pump connected to the first tank and the reaction retort,
means responsive to the level of the solution in the first holding tank for energizing said first pump to feed the etching solution from the first tank to the retort,
a second tank for holding sodium hydroxide,
a second pump connected to the second tank and the reaction retort,
first means responsive to a first level of the solution in the retort for de-energizing said first pump and for energizing said second pump to feed the sodium hydroxide from the second tank to the retort to react said sodium hydroxide with ammonium peroxydisulphate etching solution to produce ammonia gas and a copper slurry containing copper oxide and copper hydroxide,
an escape vent connected to the top of the retort for removing the ammonia gas from the retort,
a settling basin connected to the retort for collecting the copper slurry and for allowing the copper oxide and copper hydroxide to settle out of said slurry,
a third pump connected to the reaction retort and the settling basin,
a source of water,
a spraying device located in the escape vent and connected to the source of water,
second means responsive to a second level of the solution in the reaction retort for de-energizing said second pump and for actuating said spraying device to scatter water in said vent to react such water with the ammonia gas to produce an ammonium hydroxide solution,
a sensing tank connected to the vent for collecting said ammonium hydroxide,
timing means,
a pH responsive control circuit rendered effective by said timing means a predetermined time after the reaction in the retort has commenced and having a pair of electrodes positioned in the sensing tank for rendering ineffective said spraying device and for actuating said third pump to pass the copper slurry to said settling basin.

4. An apparatus for treating copper-contaminated ammonium peroxydisulphate etching solution, which comprises:
a reaction retort for holding the etching solution to be treated and at least half as much of a twenty-five percent sodium hydroxide solution which reacts with the etching solution,
means for heating the reaction retort to a temperature and for a time sufficient to increase the reaction of the sodium hydroxide solution with the etching solution to convert most of the copper ions to an insoluble copper oxide and copper hydroxide precipitate in a slurry and to convert the ammonium ions to ammonia gas,
a vent located at the top of the retort for passing the ammonia gas out of the retort,
a spray for discharging droplets of water into the vent to dissolve most of the ammonia gas passing through the vent to form an ammonium hydroxide solution,
a sensing tank connected to the vent for collecting the ammonium hydroxide solution from the vent,
means including electrodes positioned in the sensing tank for sensing the pH of the ammonium hydroxide solutions throughout the reaction,
a timing device for rendering effective the pH sensing means at a predetermined time after the start of the reaction when the pH of the ammonium hydroxide solution rises above 9, which point corresponds to a time when reaction in the retort is well under way and substantial quantities of ammonia gas are being driven off,
means responsive to the pH sensing means for terminating the reaction when the pH of the ammonium hydroxide solution again passes below 9, which corresponds to a time when the reaction is substantially complete and substantially all the ammonia gas has been driven off.

5. The apparatus according to claim 4 wherein means are provided for settling the copper oxide and copper hydroxide out from the slurry to leave supernatant liquor and wherein the means for terminating the reaction includes a pump for passing the slurry from the reaction retort to the separating means after the pH sensing means has indicated that the reaction is substantially complete.

6. An apparatus for treating a spent ammonium peroxydisulphate etching solution, which comprises
a first tank for receiving said spent etching solution,
a retort,
a first normally closed pump means interconnecting said tank and said retort,
means responsive to the receipt of a predetermined amount of spent etching solution in said first tank for opening said first pump means to pass etching solution from said tank to said retort,
means responsive to the receipt of a predetermined amount of etching solution in said retort for closing said pump means,
a second tank containing a solution of sodium hydroxide,
a second normally closed pump means interconnecting said second tank and said retort,
means responsive to the receipt of a predetermined amount of etching solution in said retort for opening said second pump means to pass said solution of sodium hydroxide to said retort,
means responsive to the receipt of a predetermined amount of said solution of sodium hydroxide for closing said second pump means, and
means responsive to the receipt of said predetermined amount of solutions of sodium hydroxide and etching solution for heating said solution in said retort to drive off ammonia gas, a third normally closed pump means connected to said retort for draining said retort, and means responsive to a predetermined pH value of said ammonia gas for operating said third normally closed pump means.

7. In a system for automatically treating a copper-contaminated ammonium peroxydisulphate etching solution to recover the copper therefrom and to render innoxious the remaining solution, a first tank for holding the copper-contaminated ammonium peroxydisulphate etching solution, a reaction retort, a first pump connected to the first tank and the reaction retort, means responsive to the level of the solution in the first holding tank for energizing said first pump to feed the etching solution from the first tank to the retort, a second tank for holding sodium hydroxide, a second pump connected to the second tank and the reaction retort, first means responsive to a first level of the solution in the retort for de-energizing said first pump and for energizing said second pump to feed the sodium hydroxide from the second tank to the retort to react said sodium hydroxide with ammonium peroxydisulphate etching solution to produce ammonia gas and a copper slurry containing copper oxide and copper hydroxide.

an escape vent connected to the top of the retort for removing the ammonia gas from the retort, a settling basin connected to the retort for collecting the copper slurry and for allowing the copper oxide and copper hydroxide to settle out of said slurry leaving a supernatant liquor, a third pump connected to the reaction retort and the settling basin, a source of water, a spraying device located in the escape vent and connected to the source of water, second means responsive to a second level of the solution in the reaction retort for de-energizing said second pump and for actuating said spraying device to scatter water in said vent to react such water with ammonia gas to produce an ammonium hydroxide solution, an acid neutralizing tank, a holding tank, a fourth pump connected to the holding tank and the acid neutralizing tank, a sensing tank positioned within said holding tank and connected to the vent for first collecting said ammonium hydroxide and then overflowing the ammonium hydroxide into said holding tank, third means responsive to the second level of the solution in the reaction retort for energizing said fourth pump to feed the ammonium hydroxide into the acid neutralizing tank, timing means, a pH responsive control circuit having a pair of electrodes positioned in the sensing tank and rendered effective by said timing means a predetermined time after the reaction in the retort has commenced for rendering ineffective said spraying device and for actuating said third pump to pass the copper slurry to said settling basin, means responsive to the level of the supernatant liquor in the settling basin for feeding said liquor into the acid neutralizing tank to react such liquor with the ammonium hydroxide to neutralize such liquor and sodium hydroxide.

References Cited by the Examiner
UNITED STATES PATENTS

| | | | |
|---|---|---|---|
| 2,474,497 | 6/1949 | Rowe | 23—55 X |
| 2,532,308 | 12/1950 | Hofmann | 23—55 X |
| 3,104,971 | 9/1963 | Olson | 23—55 X |

JOHN F. CAMPBELL, *Primary Examiner.*

CHARLIE T. MOON, *Examiner.*

R. F. DROPKIN, *Assistant Examiner.*

UNITED STATES PATENT OFFICE
CERTIFICATE OF CORRECTION

Patent No. 3,301,542　　　　　　　　　　　　　　　　January 31, 1967

Hugh L. Medford, Jr. et al.

It is hereby certified that error appears in the above numbered patent requiring correction and that the said Letters Patent should read as corrected below.

Column 4, line 55, for "solenoil" read -- solenoid --; column 5, line 53, for "Beseides" read -- Besides --; column 6, line 71, for "passing" read -- collecting --.

Signed and sealed this 17th day of October 1967.

(SEAL)
Attest:

Edward M. Fletcher, Jr.　　　　　　　　　　　　　　EDWARD J. BRENNER
Attesting Officer　　　　　　　　　　　　　　　　　Commissioner of Patents